United States Patent
US 9,893,381 B2
Abe et al.
Feb. 13, 2018

(54) NONAQUEOUS ELECTROLYTE CONTAINING MONOFLUOROPHOSPHORIC ESTER SALT AND NONAQUEOUS SECONDARY BATTERY USING SAME

(71) Applicant: KANTO DENKA KOGYO CO., LTD., Tokyo (JP)

(72) Inventors: Takuro Abe, Gunma (JP); Osamu Omae, Okayama (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/114,510

(22) PCT Filed: Aug. 4, 2015

(86) PCT No.: PCT/JP2015/072062
§ 371 (c)(1),
(2) Date: Jul. 27, 2016

(87) PCT Pub. No.: WO2016/024496
PCT Pub. Date: Feb. 18, 2016

(65) Prior Publication Data
US 2016/0351961 A1 Dec. 1, 2016

(30) Foreign Application Priority Data
Aug. 11, 2014 (JP) .................. 2014-163858

(51) Int. Cl.
*H01M 10/0567* (2010.01)
*H01M 10/0525* (2010.01)
*H01M 10/0569* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01); *Y02T 10/7011* (2013.01)

(58) Field of Classification Search
None
See application file for complete search history.

(56) References Cited

U.S. PATENT DOCUMENTS

| 2010/0119956 A1* | 5/2010 | Tokuda | H01M 4/134 |
| | | | 429/338 |
| 2017/0054178 A1* | 2/2017 | Sakaguchi | H01M 10/052 |
| 2017/0077550 A1* | 3/2017 | Nishie | H01M 10/052 |

FOREIGN PATENT DOCUMENTS

| JP | 2007-165125 | 6/2007 |
| JP | 2007-173180 | 7/2007 |
| WO | WO 2015/133097 | 9/2015 |
| WO | WO2017/111096 A1 * | 6/2017 |

OTHER PUBLICATIONS

International Search Report, PCT/JP2015/072062, dated Oct. 27, 2015.

* cited by examiner

Primary Examiner — Sin J Lee
(74) Attorney, Agent, or Firm — Young & Thompson

(57) ABSTRACT

Provided are a nonaqueous electrolyte for secondary batteries containing an electrolyte having high solubility in ethylene carbonate, propylene carbonate, dimethyl carbonate, diethyl carbonate, ethyl methyl carbonate, or a like solvent and capable of forming a good-quality film on the positive and the negative electrode interface and a nonaqueous secondary battery having the nonaqueous electrolyte. Specifically, an electrolyte for secondary batteries containing a lithium salt as a solute and a nonaqueous solvent is provided, the nonaqueous solvent containing a monofluorophosphoric ester salt having general formula 1 or 2, in which symbols are as defined in the description.

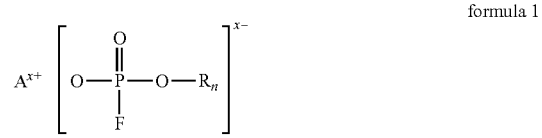

formula 1

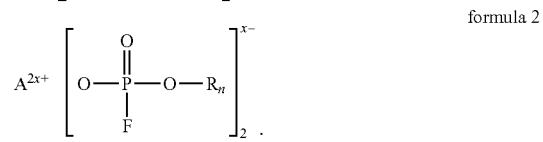

formula 2

9 Claims, 1 Drawing Sheet

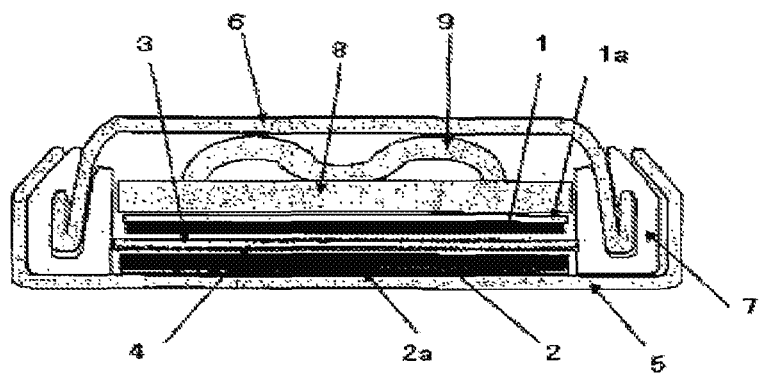

NONAQUEOUS ELECTROLYTE CONTAINING MONOFLUOROPHOSPHORIC ESTER SALT AND NONAQUEOUS SECONDARY BATTERY USING SAME

TECHNICAL FIELD

This invention relates to a novel nonaqueous electrolyte and a nonaqueous secondary battery containing the same, particularly a nonaqueous electrolyte containing a monofluorophosphoric ester salt having a specific structure and a nonaqueous secondary battery using the same.

Nonaqueous secondary batteries, such as lithium secondary batteries, are now widely used as a power source for relatively small-sized electronic equipment, including cellular phones, video camcorders, digital cameras, and notebook computers. From the recent concern for the environmental protection and energy saving, inexpensive and highly safe, large lithium secondary batteries have been under development for use in electric-powered vehicles, power tools, or for night-time usage. The market for lithium secondary batteries is considered further expanding in a variety of applications. There are thus ever-increasing demands for higher performance of lithium secondary batteries that have been diversifying and increasing in functionality. In particular, improvement on power density and energy density required for increasing functionality, prevention of capacity reduction at high or low temperatures required for enhancing reliability, improvement on cycle life, and further improvement on safety are demanded. To satisfy these advanced demands, it is needed to conduct researches to find the best suited ionic complex.

In order to overcome the challenges described above, various attempts have been made to provide improvements. Optimization of constituent members including active materials, such as positive and negative electrode materials, has been studied as a means for achieving improvements. Studies have also been directed to electrolytes, and proposals have so far been made on the choice of one or more solvents for dissolving a salt from, for example, cyclic solvents (e.g., ethylene carbonate and propylene carbonate) and acyclic solvents (e.g., dimethyl carbonate and diethyl carbonate), combinations and ratios of a plurality of solvents selected, the choice of one or more salts as a solute from, for example, lithium hexafluorophosphate, lithium tetrafluoroborate, and lithium perchlorate, combinations and ratios of a plurality of salts chosen, and the choice, combinations, and ratios of additives for improving the above discussed characteristics from, for example, fluoroethylene carbonate and trans-difluoroethylene carbonate.

A nonaqueous electrolyte is a factor that can greatly improve the characteristics of nonaqueous secondary batteries, such as performance and reliability. That is, deterioration due to decomposition of an electrolyte on the electrode surface can be controlled by optimizing the combinations and ratios of solvents, electrolyte salts, and additives.

Patent Document 1 below proposes adding at least one additive selected from the group consisting of lithium monofluorophosphate and lithium difluorophosphate to a nonaqueous electrolyte, teaching that the additive reacts with lithium used as an electrode to form a good quality film on the interface on the positive and the negative electrode and that the film prevents the contact between the active material in a charged state and the organic solvent, thereby to prevent decomposition of the nonaqueous electrolyte and improve the battery storage characteristics.

CITATION LIST

Patent Document

Patent Document 1: JP 11-67270A (JP 3439085)

SUMMARY OF THE INVENTION

Problem to be Solved by the Invention

An object of the invention is to provide a solution to the above discussed problem, specifically to find an electrolyte (additive?) having high solubility in ethylene carbonate, propylene carbonate, dimethyl carbonate, diethyl carbonate, ethyl methyl carbonate, and so on and capable of forming a good quality film on the positive and the negative electrode interface and thereby to provide an excellent nonaqueous electrolyte using the electrolyte (additive?) for secondary batteries and a nonaqueous secondary battery using the nonaqueous electrolyte.

Means for Solving the Problem

As a result of diligent investigations, the inventors have completed the invention. The invention provides the following:

[1] A nonaqueous electrolyte for a nonaqueous secondary battery comprising a lithium salt as a solute and a nonaqueous solvent containing a monofluorophosphoric ester salt represented by general formula 1:

[Chem. 1]

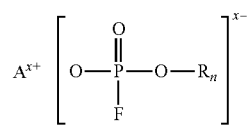

formula 1 wherein A represents an alkali metal or an onium; x represents 1; and $R_n$ represents an alkyl group having 1 to 10 carbon atoms, a halogen-substituted alkyl group having 1 to 10 carbon atoms, an alkenyl group having 2 to 10 carbon atoms, a halogen-substituted alkenyl group having 2 to 10 carbon atoms, an aryl group having 6 to 10 carbon atoms, or a halogen-substituted aryl group having 6 to 10 carbon atoms, the group represented by $R_n$ optionally having a substituent and/or a hetero atom and optionally having a cyclic structure formed of a plurality of carbon atoms.

[2] A nonaqueous electrolyte for a nonaqueous secondary battery comprising a lithium salt as a solute and a nonaqueous solvent containing a monofluorophosphoric ester salt represented by general formula 2:

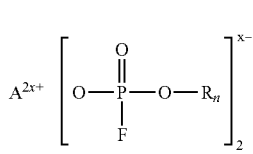

formula 2 wherein A represents an alkaline earth metal; x represents 1; and $R_n$ represents an alkyl group having 1 to 10 carbon atoms, a halogen-substituted alkyl group having 1 to 10 carbon atoms, an alkenyl group having 2 to 10 carbon atoms, a halogen-substituted alkenyl group having 2 to 10 carbon atoms, an aryl group having 6 to 10 carbon atoms, or a halogen-substituted aryl group having 6 to 10 carbon atoms, the group represented by $R_n$ optionally having a substituent and/or a hetero atom and optionally having a cyclic structure formed of a plurality of carbon atoms.

[3] The nonaqueous electrolyte as set forth in clause [1], wherein A in formula 1 is one member selected from the group consisting of lithium, sodium, potassium, ammonium, phosphonium, and sulfonium.

[4] The nonaqueous electrolyte as set forth in clause [2], wherein A in formula 2 is magnesium or calcium.

[5] The nonaqueous electrolyte as set forth in any one of clauses [1] to [4], wherein the monofluorophosphoric ester salt is present in an amount of 0.01 to 20.0% by mass relative to the total mass of the nonaqueous solvent.

[6] The nonaqueous electrolyte as set forth in any one of clauses [1] to [5], wherein the nonaqueous solvent is at least one member selected from the group consisting of ethylene carbonate, propylene carbonate, dimethyl carbonate, diethyl carbonate, and ethyl methyl carbonate.

[7] A nonaqueous secondary battery comprising a positive electrode, a negative electrode capable of absorbing and releasing lithium ions, and the nonaqueous electrolyte as set forth in any one of clauses [1] to [6].

Effect of the Invention

The monofluoroposphoric ester salt, the characteristic of the invention, has high solubility in ethylene carbonate, propylene carbonate, dimethyl carbonate, diethyl carbonate, ethyl methyl carbonate, and so on. The nonaqueous electrolyte of the invention for secondary batteries containing the ester salt is capable of forming a good quality film on the electrode interfaces, which film prevents decomposition of the nonaqueous electrolyte.

BRIEF DESCRIPTION OF THE DRAWINGS

FIG. 1 illustrates schematically a size 2032 coin cell according an embodiment of the invention.

EMBODIMENTS FOR CARRYING OUT THE INVENTION

The invention will be described based on its preferred embodiments.

The invention provides a nonaqueous electrolyte comprising a nonaqueous solvent containing a monofluorophosphoric ester salt represented by general formula 1 or 2 below and a lithium salt as a solute and a nonaqueous secondary battery containing the nonaqueous electrolyte.

[Chem. 3]

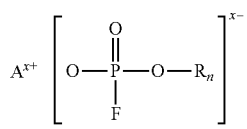

formula 1

Wherein A represents an alkali metal or an onium; x represents 1; $R_n$ represents a group selected from the group consisting of an alkyl group having 1 to 10 carbon atoms, an halogen-substituted alkyl group having 1 to 10 carbon atoms, an alkenyl group having 2 to 10 carbon atoms, a halogen-substituted alkenyl group having 2 to 10 carbon atoms, an aryl having 6 to 10 carbon atoms, and a halogen-substituted aryl group having 6 to 10 carbon atoms, the group represented by $R_n$ optionally having a substituent and/or a hetero atom and optionally having a cyclic structure formed of a plurality of carbon atoms.

In general formula 1 above, A is either one of an alkali metal and an onium.

Examples of the alkali metal include lithium, sodium, potassium, rubidium, and cesium. Lithium, sodium, or potassium is preferred for the availability and economical advantage. Examples of the onium include ammonium, phosphonium, oxonium, and sulfonium.

[Chem. 4]

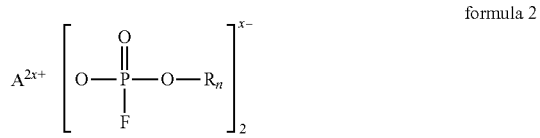

formula 2 wherein A represents an alkaline earth metal; x represents 1; and $R_n$ represents a group selected from the group consisting of an alkyl group having 1 to 10 carbon atoms, a halogen-substituted alkyl group having 1 to 10 carbon atoms, an alkenyl group having 2 to 10 carbon atoms, a halogen-substituted alkenyl group having 2 to 10 carbon atoms, an aryl having 6 to 10 carbon atoms, and a halogen-substituted aryl having 6 to 10 carbon atoms, the group represented by $R_n$ optionally having a substituent and/or a hetero atom and optionally having a cyclic structure formed of a plurality of carbon atoms.

In general formula 2 above, A is any alkaline earth metal.

Examples of the alkaline earth metal include berylium, magnesium, calcium, strontium, and barium. Magnesium or calcium is preferred for the availability and from the standpoints of cost and safety.

$R_n$ in formulae 1 and 2 is a group selected from the group consisting of an alkyl group having 1 to 10 carbon atoms, a halogen-substituted alkyl group having 1 to 10 carbon atoms, an alkenyl group having 2 to 10 carbon atoms, a halogen-substituted alkenyl group having 2 to 10 carbon atoms, and an aryl having 6 to 10 carbon atoms, and a halogen-substituted aryl having 6 to 10 carbon atoms. The $R_n$ may have a substituent and/or a hetero atom and may have a cyclic structure formed of a plurality of carbon atoms.

Examples of the C1-C10 alkyl include methyl, ethyl, isopropyl, n-butyl, t-butyl, n-hexyl, and n-decyl.

Examples of the C1-C10 halogenated alkyl include those corresponding to the alkyl groups recited above having their hydrogen atom replaced by a halogen atom, e.g., fluorine, chlorine, or bromine, such as monofluoromethyl, trifluoromethyl, dichloroethyl, and hexafluoropropyl.

Examples of the C2-C10 alkenyl include vinyl and 2-propenyl.

Examples of the C2-C10 halogenated alkenyl include those corresponding to the alkenyl groups recited above having their hydrogen atom replaced by a halogen atom, e.g., fluorine, chlorine, or bromine, such as 2-fluorovinyl and 3,3-difluoro-2-propenyl.

Examples of the C6-C10 aryl include phenyl and naphthyl.

Examples of the C6-C10 halogenated aryl include those corresponding to the aryl groups recited above having their hydrogen atom replaced by a halogen atom, e.g., fluorine, chlorine, or bromine, such as pentafluorophenyl and fluoronaphthyl.

Examples of the substituent other than halogen that may be present in Ru include hydroxyl, nitrile, nitro, carbonyl, formyl, amino, and silyl groups.

Examples of the hetero atom that may be present in Ru include boron, nitrogen, oxygen, silicon, phosphorus, sulfur, and selenium.

Examples of the cyclic structure formed of a plurality of carbon atoms include a benzene, a pyrrole, a furan, and a cycloalkane ring.

$R_n$ is preferably alkyl, halogenated alkyl, alkylene, or halogenated alkylene from the viewpoint of battery characteristics. Alkyl or halogenated alkyl is more preferred in view of ease of synthesis.

In a nonaqueous secondary battery including a positive electrode capable of absorbing and releasing lithium ions, a negative electrode capable of absorbing and releasing lithium ions, a separator, and a nonaqueous electrolyte, a good quality film is formed on the positive and the negative electrode interface by the use of the nonaqueous electrolyte including a nonaqueous solvent containing the monofluorophosphoric ester salt and a lithium salt as a solute. The film controls the contact between the active material in a charged state and the organic solvent, whereby the nonaqueous electrolyte is protected against decomposition ascribed to the contact between the active material and the electrolyte.

The amount of the monofluorophosphoric ester salt in the nonaqueous solvent is not particularly limited. However, too small the amount can fail to form a sufficient film. If added in too large an amount, on the other hand, the monofluorophosphoric ester salt may form an excessive film, or the resultant increase in viscosity of the nonaqueous electrolyte can cause reduction of electroconductivity that tends to lead to reduction in battery characteristics. Therefore, the monofluorophosphoric ester salt for use as an additive is preferably added in an amount of 0.01 to 20.0%, more preferably 0.05 to 15.0%, even more preferably 0.10 to 10.0%, by mass relative to the total mass of the nonaqueous solvent.

The nonaqueous solvent for use in the invention is not particularly limited as long as it is capable of dissolving the monofluorophosphoric ester salt. Examples of suitable nonaqueous solvents include carbonates, esters, ethers, lactones, nitriles, amides, and sulfonic acids. In particular, ethylene carbonate, propylene carbonate, dimethyl carbonate, diethyl carbonate, and ethyl methyl carbonate are preferred. These solvents may be used either individually or in combination of two or more thereof.

Examples of the solute comprising a lithium salt, which is dissolved in the nonaqueous solvent to make the nonaqueous electrolyte of the invention, include $LiPF_6$, $LiPO_2F_2$, $LiBF_4$, $LiClO_4$, $LiN(CF_3SO_2)_2$, $LiN(FSO_2)_2$, $LiCF_3SO_3$, $LiC(CF_3SO_2)_3$, $LiC(FSO_2)_3$, $LiCF_3CO_2$, $LiB(CF_3SO_3)_4$, $LiB(FSO_3)_4$, $LiB(C_2O_4)_2$, and $LiBF_2(C_2O_4)$. At least one of $LiPF_6$ and $LiBF_4$ is particularly preferred in view of improvement on electrical characteristics.

The concentration of the lithium salt in the total nonaqueous solvent is preferably 20.0 to 80.0%, more preferably 40.0 to 60.0%, by mass.

While the nonaqueous electrolyte of the invention is useful in both primary and secondary batteries, it exhibits the above described effect when used in a lithium ion secondary battery including a positive electrode and a negative electrode capable of absorbing and releasing lithium ions as provided by the invention.

The positive electrode of the nonaqueous secondary battery of the invention may be made by, for example, applying a slurry of a positive electrode active material, a binder, a conductive material, and so on in a solvent to a current collector, followed by drying and followed by pressing.

The positive electrode active material that can be used in the invention may be any substance capable of absorbing and releasing lithium ions and the potential of which is on the base side, and known, commonly used positive electrode active materials can be used, including metal compounds, such as metal oxides, metal hydroxides, metal sulfides, metal halides, and metal phosphate compounds.

Lithium-transition metal complex oxides having a layer structure (such as a metal intercalation compound), a spinel structure, or an olivine structure are useful.

The transition metal element preferably includes at least one metal selected, e.g., from nickel, cobalt, manganese, titanium, and iron.

Transition metal complex oxides composed of the transition metal element having added thereto, or substituted by, lithium, magnesium, aluminum, or titanium are also useful.

In order to obtain a high energy density nonaqueous secondary battery, it is preferred to use a lithium-transition metal complex oxide having a layer structure as a positive electrode active material. Preferred examples of such a lithium-transition metal complex oxide include a lithium-cobalt complex oxide, a lithium-cobalt-nickel-manganese complex oxide, and a lithium-cobalt-nickel-aluminum complex oxide.

The amount of the positive electrode active material to be used is preferably 10.0 to 99.9%, more preferably 50.0 to 98.0%, by mass with respect to the total mass of the positive electrode active material, conductive material, and binder.

Examples of the conductive material include acetylene black, Ketjen black, furnace black, needle coke, and graphite, with acetylene black and graphite being preferred.

The amount of the conductive material to be used is preferably 0.05% to 50.0%, more preferably 1.0 to 30.0%, by mass with respect to the total amount of the positive electrode active material, conductive material, and binder.

Examples of suitable binders include polyvinylidene fluoride (PVDF), carboxymethyl cellulose (CMC), styrene-butadiene rubber (SBR), polyvinyl alcohol (PVA), polyvinyl chloride (PVC), polypropylene (PP), and polybutadiene (BR), with PVDF, CMC, and SBR being preferred.

The amount of the binder is preferably 0.05% to 50.0%, more preferably 1.0% to 30.0%, by mass relative to the total amount of the positive electrode active material, conductive material, and binder.

The solvent used to make a slurry may be an aqueous solvent, such as water and alcohols, or an organic solvent, such as N-methyl-2-pyrrolidone (NMP), dimethylformamide, metal acetate, and N,N-dimethylaminopropylamine. Water is a preferred aqueous solvent, and NMR is a preferred organic solvent. The amount of the solvent to be used is preferably 20.0 to 90.0 parts, more preferably 30.0 to 80.0 parts, by mass per 100 parts by mass of the positive electrode active material.

The positive electrode current collector may be made of aluminum, stainless steel, nickel steel, or copper steel.

Similarly to the positive electrode, the negative electrode of the nonaqueous secondary battery of the invention may be made by, for example, applying a slurry of a negative electrode active material, a binder, a conductive material, and so on in a solvent to a current collector, followed by drying and followed by pressing.

The negative electrode active material that can be used in the invention may be any substance capable of absorbing and releasing lithium ions, and known, commonly used negative electrode active materials can be used, including metallic lithium; lithium alloys, such as a lithium-silicon alloy and a lithium-tin alloy; tin or titanium base compounds, such as a tin-silicon alloy, a lithium-titanium alloy, a tin-titanium alloy, and a titanium oxide; carbon materials, and conductive polymers.

The tin or titanium base compounds are exemplified by oxides the potential of which is less noble than the positive electrode active material, such as $SnO_2$, $SnO$, and $TiO_2$.

It is preferred to use as a negative electrode active material a carbon material that undergoes a smaller volumetric change with lithium absorption and release and exhibits excellent reversibility, such as crystalline graphite.

With respect to the kinds and amounts of the binder, the conductive material, and the slurrying solvent used to make the negative electrode, the corresponding description about the positive electrode applies.

The current collector of the negative electrode may be made of, for example, copper, nickel, stainless steel, or nickel-plated steel.

It is preferred to dispose a porous film as a separator between the positive and negative electrodes for short circuit prevention. In that case, the nonaqueous electrolyte is used as infiltrated into the separator. The porous film is not particularly limited in material and shape as long as it is stable against the electrolyte and has good liquid retentivity. Suitable examples include porous sheets or nonwoven fabrics made of polyolefins, such as polypropylene and polyethylene.

The porous sheet may be made of, e.g., polyethylene, polypropylene, polyvinylidene fluoride, polyvinylidene chloride, polyacrylonitrile, polyacrylamide, polycarbonate, polyamide, polyimide, polytetrafluoroethylene, poly(meth) acrylic acid, and their copolymers or mixtures.

The nonaqueous secondary battery of the invention is not particularly limited in shape and may have various shapes, including a coin, cylinder, prism, pouch, and the like shape. For instance, a coin cell battery may have the shape illustrated in FIG. 1.

A nonaqueous secondary battery provided in the form of a coin cell as shown in FIG. 1 may include a positive electrode 1 capable of releasing lithium ions, a positive electrode current collector 1a, a negative electrode 2 capable of absorbing and releasing the lithium ions released from the positive electrode, a negative electrode current collector 2a, a nonaqueous electrolyte 3 according to the invention, a separator 4, a case 5, a cap 6, a gasket 7, a spacer 8, and a wave washer 9.

EXAMPLES

The invention will now be illustrated in greater detail by way of Preparation Examples, but it should be understood that the invention is not limited thereto. The reaction products were analyzed through $^1$H-NMR, $^{19}$F-NMR, and $^{31}$P-NMR using NMR System 300 available from Varian Inc. The anion analysis of the reaction products was conducted by ion chromatography using 883 Basis IC Plus from Metrohm Japan. The ion chromatography was carried out using a Metrosep A supp 5-250 column from Metrohm Japan (length: 250.0 mm; inner diameter: 4.0 mm; particle diameter: 5 μm) and 1.0 mM $NaHCO_3$/3.2 mM $Na_2CO_3$ as an eluent. The flow rate of the eluent was 0.7 ml/min.

Preparation Example 1—Preparation of Lithium Methyl Monofluorophosphate

In a 250 ml PFA container, 7.6 g (0.18 mol) of lithium chloride, 25.0 g (0.16 mol) of phosphoryl chloride, and 62.5 g of dimethyl carbonate were weighed out. While stirring the mixture at 10° C., 2.9 g (0.16 mol) of pure water was added thereto dropwise over 30 minutes under nitrogen gas seal. After an additional 30 minutes of stirring, 5.2 g (0.16 mol) of absolute methanol (water content: 0.1%) was slowly added thereto dropwise over 30 minutes while stirring. After an additional 30 minutes of stirring, 34.3 g of a 14% solution of hydrogen fluoride in dimethyl carbonate (containing 0.24 mol of hydrogen fluoride) was added, followed by stirring at 10° C. for 30 minutes. The stirring was further continued at 120° C. for 1 hour under nitrogen gas seal. The reaction mixture was heated at 120° C. for 2 hours to remove the excess of the solvent and the reaction by-product by evaporation. The residue was cooled to room temperature to give crude lithium methyl monofluorophosphate. The resulting crude product was purified by ion chromatography. The peak of lithium methyl monofluorophosphate was observed at a retention time of 6.5 to 6.7 min with a relative peak area of 84%. As a result of NMR analyses, the peak of lithium methyl monofluorophosphate was observed at 3.6 ppm (d) in $^1$H-NMR (acetone), −4.9 ppm (d) in $^{31}$P-NMR (acetone), and −84.1 ppm (d) in $^{19}$F-NMR (acetone).

Preparation Example 2—Preparation of Lithium Ethyl Monofluorophosphate

In a 250-ml PFA container, 7.6 g (0.18 mol) of lithium chloride, 25.0 g (0.16 mol) of phosphoryl chloride, and 62.5 g of diethyl carbonate were weighed out. While stirring the mixture at 10° C., 2.9 g (0.16 mol) of pure water was added thereto dropwise over 30 minutes under nitrogen gas seal. After an additional 30 minutes of stirring, 7.4 g (0.16 mol) of absolute ethanol (water content: 0.5%) was slowly added thereto dropwise over 30 minutes while stirring. After an additional 30 minutes of stirring, 34.3 g of a 14% solution of hydrogen fluoride in dimethyl carbonate (containing 0.24 mol of hydrogen fluoride) was added, followed by stirring at 10° C. for 30 minutes. The stirring was further continued at 120° C. for 1 hour under nitrogen gas seal. The reaction mixture was heated at 120° C. for 2 hours to remove the excess of the solvent and the reaction by-product by evaporation. The residue was cooled to room temperature to yield crude lithium ethyl monofluorophosphate. The resulting crude product was purified by ion chromatography, where the peak of lithium ethyl monofluorophosphate was observed at a retention time of 6.5 to 6.7 min with a relative peak area of 88%. As a result of NMR analyses, the peak of lithium ethyl monofluorophosphate was observed at −5.9 ppm (d) in $^{31}$P-NMR (acetone) and −81.1 ppm (d) in $^{19}$F-NMR (acetone).

Preparation Example 3—Preparation of Lithium Hexyl Monofluorophosphate

In a 250 ml PFA container, 7.6 g (0.18 mol) of lithium chloride, 25.0 g (0.16 mol) of phosphoryl chloride, and 62.5 g of dimethyl carbonate were weighed out. While stirring the mixture at 10° C., 2.9 g (0.16 mol) of pure water was added thereto dropwise over 30 minutes under nitrogen gas seal.

After an additional 30 minutes of stirring, 16.3 g (0.16 mol) of absolute n-hexanol was slowly added thereto dropwise over 30 minutes while stirring. After an additional 30 minutes of stirring, 34.3 g of a 14% solution of hydrogen fluoride in dimethyl carbonate (containing 0.24 mol of hydrogen fluoride) was added, followed by stirring at 10° C. for 30 minutes. The reaction mixture was heated at 120° C. for 2 hours to remove the excess of the solvent and the reaction by-product by evaporation. The residue was cooled to room temperature to yield crude lithium hexyl monofluorophosphate. The resulting crude product was purified by ion chromatography, where the peak of lithium hexyl monofluorophosphate was observed at a retention time of 6.5 to 6.7 min with a relative peak area of 81%. As a result of NMR analyses, the peak of lithium hexyl monofluorophosphate was observed at −6.2 ppm (d) in $^{31}$P-NMR (acetone) and −81.8 ppm (d) in $^{19}$F-NMR (acetone).

Preparation Example 4—Preparation of Lithium Decyl Monofluorophosphate

In a 250 ml PFA container, 7.6 g (0.18 mol) of lithium chloride, 25.0 g (0.16 mol) of phosphoryl chloride, and 62.5 g of dimethyl carbonate were weighed out. While stirring the mixture at 10° C., 2.9 g (0.16 mol) of pure water was added thereto dropwise over 30 minutes under nitrogen gas seal. After an additional 30 minutes of stirring, 25.3 g (0.16 mol) of absolute n-decanol was slowly added thereto dropwise over 30 minutes while stirring. After an additional 30 minutes of stirring, 25.2 g of a 20% solution of hydrogen fluoride in dimethyl carbonate (containing 0.25 mol of hydrogen fluoride) was added, followed by stirring at 10° C. for 30 minutes. The reaction mixture was heated at 120° C. for 2 hours to remove the excess of the solvent and the reaction by-product by evaporation. The residue was cooled to room temperature to yield crude lithium decyl monofluorophosphate. The resulting crude product was purified by ion chromatography, where the peak of lithium decyl monofluorophosphate was observed at a retention time of 6.5 to 6.7 min with a relative peak area of 87%. As a result of NMR analyses, the peak of lithium decyl monofluorophosphate was observed at −6.2 ppm (d) in $^{31}$P-NMR (acetone) and −81.7 ppm (d) in $^{19}$F-NMR (acetone).

Preparation Example 5—Preparation of Calcium Methyl Monofluorophosphate

In a 250 ml PFA container, 7.7 g (0.08 mol) of calcium carbonate, 25.0 g (0.16 mol) of phosphoryl chloride, and 62.5 g of dimethyl carbonate were weighed out. While stirring the mixture at 10° C., 1.5 g (0.08 mol) of pure water was added thereto dropwise over 30 minutes under nitrogen gas seal. After an additional 30 minutes of stirring, 5.8 g (0.16 mol) of absolute methanol was slowly added thereto dropwise over 30 minutes while stirring. After an additional 30 minutes of stirring, 25.2 g of a 20% solution of hydrogen fluoride in dimethyl carbonate (containing 0.25 mol of hydrogen fluoride) was added, followed by stirring at 10° C. for 30 minutes. The reaction mixture was heated at 120° C. for 2 hours to remove the excess of the solvent and the reaction by-product by evaporation. The residue was cooled to room temperature to give crude calcium methyl monofluorophosphate. The resulting crude product was purified by ion chromatography. The peak of calcium methyl monofluorophosphate was observed at a retention time of 6.5 to 6.7 min with a relative peak area of 85%. As a result of NMR analyses, the peak of calcium methyl monofluorophosphate was observed at 3.8 ppm (d) in $^{1}$H-NMR (acetone), −7.4 ppm (d) in $^{31}$P-NMR (acetone), and −84.2 ppm (d) in $^{19}$F-NMR (acetone).

Preparation Example 6—Preparation of Mixture of Lithium Methyl Monofluorophosphate and Lithium Difluorophosphate In a 250 ml PFA container, 10.8 g (0.10 mol) of lithium difluorophosphate and 40 g (44.4 mol) of 1,2-dimethoxyethane were weighed out. While stirring the mixture at 60° C., 1.3 g (0.04 mol) of absolute methanol (water content: 0.1%) was slowly added thereto dropwise over 30 minutes under nitrogen gas seal. After an additional 30 minutes of stirring, the reaction mixture was heated at 120° C. for 2 hours to remove the excess of the solvent and the reaction by-product by evaporation. The residue was cooled to room temperature to give a crude mixture of lithium methyl monofluorophosphate and lithium difluorophosphate. The resulting crude product was purified by ion chromatography, where the peak of lithium methyl monofluorophosphate was observed at a retention time of 6.5 to 6.7 min with a relative peak area of 73%. As a result of NMR analyses, the peak of lithium methyl monofluorophosphate was observed at 3.6 ppm (d) in $^{1}$H-NMR (acetone), −4.9 ppm (d) in $^{31}$P-NMR (acetone), and −84.1 ppm (d) in $^{19}$F-NMR (acetone).

Comparative Preparation Example 1—Preparation of Lithium Difluorophosphate (Using Lithium Chloride)

In a 500 ml PFA bottle was put 100.1 g (0.66 mol) of granular lithium hexafluorophosphate. The bottle was set on a shaker under nitrogen seal, and 47.5 g (2.64 mol) of pure water and 123.0 g (2.90 mol) of lithium chloride powder were fed into the bottle at a rate of 0.2 g/min and 2.1 g/min, respectively, and allowed to react at 40° C. for 22 hours. The resulting crystals were dried in a dryer at 120° C. in a nitrogen stream to yield crude lithium difluorophosphate. As a result of purification by ion chromatography, the relative peak area of the lithium difluorophosphate was 99% or more.

Comparative Preparation Example 2—Preparation of Lithium Difluorophosphate (Using Thienyl Chloride)

A 500 ml PFA bottle containing 100.3 g (0.66 mol) of granular lithium hexafluorophosphate was set on a shaker under nitrogen seal, and 27.9 g (1.55 mol) of pure water and 260.5 g (2.19 mol) of thienyl chloride were fed into the bottle at a rate of 0.2 g/min and 1.7 g/min, respectively, and allowed to react at 25° C. for 22 hours. The resulting crystals were dried in a dryer at 120° C. in a nitrogen stream to yield crude lithium difluorophosphate. As a result of purification by ion chromatography, the relative peak area of the lithium difluorophosphate was 99% or more.

Evaluation of Battery Cell

With the object of demonstrating the effect of the monofluorophosphoric ester salt of formula 1 in forming a good quality film, nonaqueous secondary batteries were assembled using a nonaqueous electrolyte containing the monofluorophosphoric ester salt of formula 1 and tested for evaluation.

In the evaluation test, size 2032 coin cells illustrated in FIG. 1 were made according to the following procedure using an electrolyte solution containing the lithium methyl monofluorophosphate of Preparation Example 1, lithium ethyl monofluorophosphate of Preparation Example 2, lithium hexyl monofluorophosphate of Preparation Example 3, or lithium decyl monofluorophosphate of Preparation Example 4.

(1) Making of $LiCoO_2$ Positive Electrode

A positive electrode material was prepared by mixing 93 parts (by mass, hereinafter the same) of $LiCoO_2$ as an active material, 4 parts of acetylene black as a conductive material, and 3 pats of polyvinylidene fluoride (PVDF) as a binder. The positive electrode material was dispersed in N-methyl-2-pyrrolidone (NMP) to prepare a slurry. The slurry was applied to a side of an aluminum current collector, dried, and pressed to make an $LiCoO_2$ positive electrode.

(2) Making of Graphite Negative Electrode

A negative electrode material prepared by mixing 97.0 parts of artificial graphite as an active material and, as binders, 2.0 parts of styrene-butadiene rubber (SBR) and 1.0 part of carboxymethyl cellulose (CMC) was dispersed in water to prepare a slurry. The slurry was applied to a side of a copper current collector, dried, and pressed to make a graphite negative electrode.

(3) Assembly of Coin Cell

A 2032 coin cell was assembled using 2032 coin cell parts made of SUS316L.

The above prepared $LiCoO_2$ positive electrode and graphite negative electrode were cut to size to make a positive electrode 1 and a negative electrode 2. A 25 μm thick polypropylene separator 4 impregnated with a nonaqueous electrolyte 3 containing each of the monofluorophosphoric ester salts prepared in Preparation Examples 1 to 4 was sandwiched in between the positive electrode 1 and the negative electrode 2 and put into a case 5 having a gasket 7 therein. A spacer 8 and a wave washer 9 were stacked thereon in that order. A cap 6 was placed to close the cell, and the cell was sealed to make a 2032 coin cell.

Example 1

A nonaqueous electrolyte was prepared by dissolving 1.1 mol/l of lithium hexafluorophosphate ($LiPF_6$) as a solute electrolyte in a nonaqueous solvent composed of ethylene carbonate (EC) and ethyl methyl carbonate (EMC) at an EC to EMC mixing rate of 3:7 by volume and adding thereto lithium methyl monofluorophosphate in a concentration of 3 wt %. A 2032 coin cell shown in FIG. 1 as a nonaqueous secondary battery was assembled using the resulting nonaqueous electrolyte according to the procedure described above.

Example 2

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume and adding lithium ethyl monofluorophosphate to the solution in a concentration of 3 wt %. A 2032 coin cell shown in FIG. 1 as a nonaqueous secondary battery was assembled using the resulting nonaqueous electrolyte according to the procedure described above.

Example 3

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume and adding lithium hexyl monofluorophosphate to the solution in a concentration of 3 wt %. A 2032 coin cell shown in FIG. 1 as a nonaqueous secondary battery was made using the resulting nonaqueous electrolyte according to the procedure described above.

Example 4

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume and adding lithium decyl monofluorophosphate to the solution in a concentration of 3 wt %. A 2032 coin cell shown in FIG. 1 as a nonaqueous secondary battery was made using the resulting nonaqueous electrolyte according to the procedure described above.

Comparative Example 1

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume and adding lithium difluorophosphate to the solution in a concentration of 1 wt %. A 2032 coin cell shown in FIG. 1 as a nonaqueous secondary battery was made using the resulting nonaqueous electrolyte according to the procedure described above.

Comparative Example 2

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume and adding lithium difluorophosphate to the solution in a concentration of 3 wt %. A 2032 coin cell shown in FIG. 1 as a nonaqueous secondary battery was made using the resulting nonaqueous electrolyte according to the procedure described above.

Comparative Example 3

A nonaqueous electrolyte was prepared by dissolving 1.1 mol/l of lithium hexafluorophosphate ($LiPF_6$) as a solute electrolyte in a nonaqueous solvent composed of EC and EMC at an EC to EMC mixing rate of 3:7 by volume. A 2032 coin cell shown in FIG. 1 as a nonaqueous secondary battery was made using the resulting nonaqueous electrolyte according to the procedure described above.

Each of the nonaqueous secondary batteries obtained in Examples 1 to 4 and Comparative Examples 1 to 3 was charged at 25° C. to 4.2 V at a constant current of 3.5 mA and then at that voltage until the current reduced to 0.35 mA. The cell was then discharged to 2.75 V at a constant current of 3.5 mA to determine the initial discharge capacity. The initial discharge capacity of each cell was expressed relatively taking that of the cell of Comparative Example 3 as 100. The results obtained are shown in Table 1 below.

Each of the nonaqueous secondary batteries obtained in Examples 1 to 4 and Comparative Examples 1 to 3 was charged at 25° C. to 4.2 V at a constant current of 3.5 mA and then at that voltage until the current reduced to 0.35 mA.

The cell was then discharged to 2.75 V at a constant current of 3.5 mA to determine the pre-storage discharge capacity $D_1$ of the cell.

Subsequently, each cell was charged to 4.2 V at a constant current of 3.5 mA and then at a constant voltage of 4.2 V until the current decayed to 0.35 mA. In that charged state, the cell was stored in a thermostat at 60° C. for 10 days.

After the storage, the cell was discharged at a constant current of 3.5 mA to a voltage of 2.75 V at 25° C. to determine the post-storage residual capacity $D_2$.

Thereafter, the cell was charged at 25° C. to 4.2 V at a constant current of 3.5 mA and then at a constant voltage of 4.2 V until the current decayed to 0.35 mA, followed by discharging at a constant current of 3.5 mA to 2.75 V to determine the post-storage recovered capacity $D_3$.

The capacity retention (%) and capacity recovery (%) of each cell after the storage were calculated based on the pre-storage discharge capacity $D_1$, post-storage residual capacity $D_2$, and post-storage recovered capacity $D_3$ according to the formulae below. The results are shown in Table 1.

Capacity retention (%)=$(D_2/D_1) \times 100$

Capacity recovery (%)=$(D_3/D_1) \times 100$

TABLE 1

| | Additive | | Initial Discharge Capacity | Capacity Retention (%) | Capacity Recovery (%) |
|---|---|---|---|---|---|
| | Fluoro-phosphate | Amount | | | |
| Example 1 | Li methyl monofluoro-phosphate | 3 wt % | 101 | 91 | 95 |
| Example 2 | Li ethyl monofluoro-phosphate | 3 wt % | 101 | 90 | 96 |
| Example 3 | Li hexyl monofluoro-phosphate | 3 wt % | 100 | 89 | 94 |
| Example 4 | Li decyl monofluoro-phosphate | 3 wt % | 100 | 85 | 93 |
| Compara. Example 1 | Li difluoro-phosphate | 1 wt % | 102 | 79 | 91 |
| Compara. Example 2 | Li difluoro-phosphate | 3 wt % | 90 | 59 | 92 |
| Compara. Example 3 | none | 0 wt % | 100 | 75 | 88 |

It is seen from Table 1 that the initial discharge capacities of the nonaqueous secondary batteries of Examples 1 to 4 and Comparative Example 1 are comparable to that of Comparative Example 3, whilst the nonaqueous secondary battery of Comparative Example 2 has a reduced initial discharge capacity. This is believed to be because the lithium difluorophosphate, the fluorophosphate used in Comparative Example 2, when added in an amount of 3 wt % partly remains undissolved on an account of its low solubility in the nonaqueous solvent, resulting in adverse effect on the charge/discharge cycle of the battery.

The nonaqueous secondary batteries of Examples 1 to 4 having the nonaqueous electrolyte containing 3 wt % of lithium methyl monofluorophosphate of Preparation Example 1, lithium ethyl monofluorophosphate of Preparation Example 2, lithium hexyl monofluorophosphate of Preparation Example 3, or lithium decyl monofluorophosphate of Preparation Example 4, which are monofluorophosphoric ester salts represented by formula 1, exhibit improvements on both capacity retention and capacity recovery as compared with the battery of Comparative Example 1 having a nonaqueous electrolyte containing 1 wt % of lithium difluorophosphate and the battery of Comparative Example 3 having a nonaqueous electrolyte containing no fluorophosphate.

The monofluorophosphoric ester salt of formula 1 has high solubility in nonaqueous solvents and forms a good-quality film on the positive and the negative electrode interface to provide nonaqueous secondary batteries exhibiting excellent battery characteristics.

DESCRIPTION OF REFERENCE NUMERALS

1: positive electrode
1a: positive electrode current collector
2: negative electrode
2a: negative electrode current collector
3: nonaqueous electrolyte
4: separator
5: case
6: cap
7: gasket
8: spacer
9: wave washer

The invention claimed is:

1. A nonaqueous electrolyte for a nonaqueous secondary battery comprising a lithium salt as a solute and a nonaqueous solvent containing a monofluorophosphoric ester salt represented by general formula 2:

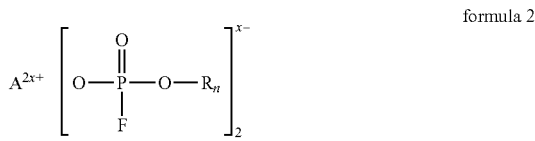

formula 2 wherein A represents an alkaline earth metal; x represents 1; and
$R_n$ represents an alkyl group having 1 to 10 carbon atoms, a halogen-substituted alkyl group having 1 to 10 carbon atoms, an alkenyl group having 2 to 10 carbon atoms, a halogen-substituted alkenyl group having 2 to 10 carbon atoms, an aryl group having 6 to 10 carbon atoms, or a halogen-substituted aryl group having 6 to 10 carbon atoms, the group represented by $R_n$ optionally having a substituent and/or a hetero atom and optionally having a cyclic structure formed of a plurality of carbon atoms.

2. The nonaqueous electrolyte according to claim 1, wherein A in formula 2 is magnesium or calcium.

3. The nonaqueous electrolyte according to claim 2, wherein the monofluorophosphoric ester salt is present in an amount of 0.01 to 20.0% by mass relative to the total mass of the nonaqueous solvent.

4. The nonaqueous electrolyte according to claim 2, wherein the nonaqueous solvent is at least one member selected from the group consisting of ethylene carbonate, propylene carbonate, dimethyl carbonate, diethyl carbonate, and ethyl methyl carbonate.

5. A nonaqueous secondary battery comprising a positive electrode, a negative electrode capable of absorbing and releasing lithium ions, and the nonaqueous electrolyte according to claim 2.

6. The nonaqueous electrolyte according to claim 1, wherein the monofluorophosphoric ester salt is present in an amount of 0.01 to 20.0% by mass relative to the total mass of the nonaqueous solvent.

7. The nonaqueous electrolyte according to claim 6, wherein the nonaqueous solvent is at least one member selected from the group consisting of ethylene carbonate, propylene carbonate, dimethyl carbonate, diethyl carbonate, and ethyl methyl carbonate.

8. The nonaqueous electrolyte according to claim 1, wherein the nonaqueous solvent is at least one member selected from the group consisting of ethylene carbonate, propylene carbonate, dimethyl carbonate, diethyl carbonate, and ethyl methyl carbonate.

9. A nonaqueous secondary battery comprising a positive electrode, a negative electrode capable of absorbing and releasing lithium ions, and the nonaqueous electrolyte according to claim 1.

* * * * *